US005469544A

United States Patent [19]
Aatresh et al.

[11] Patent Number: 5,469,544
[45] Date of Patent: Nov. 21, 1995

[54] CENTRAL PROCESSING UNIT ADDRESS PIPELINING

[75] Inventors: Deepak J. Aatresh, Sunnyvale; Tosaku Nakanishi, Cupertino, both of Calif.; Gregory S. Mathews, Boca Raton, Fla.

[73] Assignee: Intel Corporation, Santa Clara, Calif.

[21] Appl. No.: 973,720

[22] Filed: Nov. 9, 1992

[51] Int. Cl.[6] ........................................... G06F 13/00
[52] U.S. Cl. ..................... 395/290; 395/496; 395/308; 395/878
[58] Field of Search .................... 395/200, 500, 395/325, 425

[56] References Cited

U.S. PATENT DOCUMENTS

| | | | |
|---|---|---|---|
| 4,851,990 | 7/1989 | Johnson et al. | 395/325 |
| 5,029,124 | 7/1991 | Leahy et al. | 395/325 |
| 5,058,005 | 10/1991 | Culley | 395/425 |
| 5,146,582 | 9/1992 | Begun | 395/500 |
| 5,289,584 | 2/1994 | Thome et al. | 395/325 |

*Primary Examiner*—Roy N. Envall, Jr.
*Assistant Examiner*—Paulina Lintsai
*Attorney, Agent, or Firm*—Blakely, Sokoloff, Taylor & Zafman

[57] ABSTRACT

A microprocessor for use in a computer system which pipelines addresses for both burst and non-burst mode data transfers. By pipelining addresses, the microprocessor is able to increase the throughput of data transfers in the system. In the present invention, bits are used which may be programmed to disable and enable the address pipelining for the non-burst mode and burst mode transfers.

20 Claims, 6 Drawing Sheets

FIG_1 (PRIOR ART)

FIG_2

FIG_3

FIG_4

FIG_5

FIG_5

FIG_7

FIG_8

CENTRAL PROCESSING UNIT ADDRESS PIPELINING

FIELD OF THE INVENTION

The present invention relates to the field of data transfers in computer systems; particularly, the present invention relates to pipelining addresses on the internal address bus of a microprocessor to facilitate the transfer of data in a computer system.

BACKGROUND OF THE INVENTION

Today, typical computer systems include a microprocessor for executing instructions, a memory for storing instructions and data and a bus for communicating information. Some current microprocessors perform pipelined execution of instructions. In a pipelined processor, the entire process of executing instructions is divided into stages of execution, during which a separate part of the execution process is completed. By pipelining, portions of many instructions are at different stages of execution, such that every cycle another instruction completes execution. By completing execution of an instruction each clock cycle, the throughput of the microprocessor increases.

In computer systems, microprocessors are widely involved in the transfer of data between themselves and other components in the computer system. The data is transferred between separate components (e.g., a microprocessor and main memory) over a data bus. Transfers usually occur in single data cycles. A single data cycle typically includes two clock pulses. During the first clock pulse, an address is transferred onto the address bus, while during the second clock phase, the data corresponding to the address is transferred onto the data bus.

Figure 1:
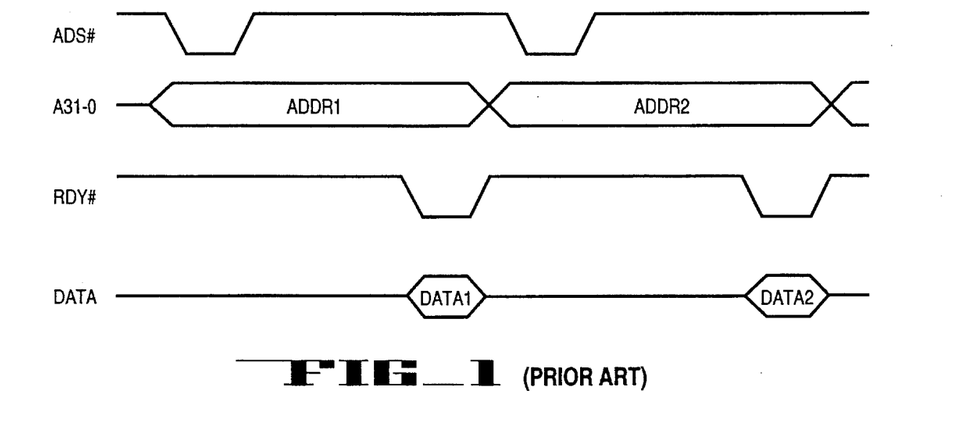
FIG. 1 is a timing diagram of a prior art data transfer.

A typical data transfer cycle involving a microprocessor in a computer system is shown in FIG. 1. Referring to FIG. 1, the data transfer begins with the microprocessor driving an address, ADDR1, onto the address bus (A31-0). An address strobe signal, ADS#, is asserted by the microprocessor to indicate that a bus cycle is occurring and that the address currently on the address bus is valid. The address is then decoded in the computer system. The data, DATA 1, is then driven onto the data bus. In current computer systems, the data usually comprises four bytes. A ready signal, RDY#, is asserted when the data on the data bus is valid and is ready to be transferred. (The # indicates that the signal is active low).

One problem with the transfer depicted in FIG. 1 is that another address cannot be driven onto the address bus until after the data has been transferred. In other words, before the next address can be strobed (e.g., ADDR2 in FIG. 1), the data must have been transferred (e.g., DATA1 in FIG. 1). Therefore, there is an inherent latency between the time the address is strobed and decoded until the time the data is actually transferred. However, while the actual transfer of data occurs, the address decoders are not functioning. It would be desirable to have the next address strobed and decoded while the data corresponding to the current address is being transferred. In this manner, data can be transferred every clock cycle. Address pipelining is implemented in the Intel 80386 brand of microprocessor sold by the assignee of the present invention which does not perform burst cycles.

For bus requests that required more than a single data cycle, many microprocessors can accept burst cycles instead of normal cycles. A burst cycle transfers multiple bytes of data across the bus during one long memory cycle. For example, a transfer of a 128-bit data item across a 32-bit bus would normally occur in four groups, each group containing 4 bytes. The initial address (e.g., the first byte) is used by the processor to compute the remaining addresses for the subsequent data bytes. The concept of burst cycle transfers is well-known in the field. Note that the problem described above associated with single data cycle transfers is also applicable to burst cycle transfers in that the address corresponding to the next burst cycle cannot be asserted until the last byte of data corresponding to the first burst cycle has been transferred.

It is possible that a microprocessor may be coupled to some devices which require burst transfers and some devices which require non-burst transfers. In this type of system, it would be desirable to have the microprocessor determine automatically the type of transfer (i.e., burst or non-burst) before performing the transfer, such that the microprocessor could accommodate multiple data transfer types (i.e., burst and non-burst).

As will be shown, the present invention provides a method and means for allowing the next address to be strobed and decoded while the data corresponding to the current address is being transferred. To facilitate this, the present invention provides a method and means for pipelining address in a microprocessor. The present invention also provides a method and means for determining the type of transfer being performed (e.g., burst vs. non-burst). In this manner, the present invention is able to pipeline burst addresses and pipeline non-burst address so that the throughput of data transfers between the microprocessor and the remainder of the computer system is increased.

SUMMARY OF THE INVENTION

A method and apparatus for pipelining burst and non-burst addresses in a microprocessor is described. The present invention includes a method and means for generating a first address corresponding to a data transfer. The present invention also includes a method and means for determining whether the transfer is a burst or non-burst transfer. The address is then driven onto the external bus of the computer system. The present invention includes a method and means for transferring the data that corresponds to the address between the data bus of the external computer system and that of the microprocessor, while the address of the next bus request is driven onto the internal address bus. In this manner, if the transfer for the current bus cycle is a burst transfer then the next burst addresses are pipelined on the internal address bus and if the transfer is a non-burst transfer or the final data transfer of a burst transfer then the first address of the next transfer is pipelined on the internal address bus.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 6 is a timing diagram illustrating an example of burst data transfer according to the present invention.

FIG. 8 is a timing diagram illustrating an example of address pipelining of burst data transfers.

DETAILED DESCRIPTION OF THE INVENTION

A method and apparatus for pipelining addresses during data transfers in a microprocessor is described. In the following description, numerous specific details are set forth, such as signal names, numbers of address and data lines, etc., in order to provide a thorough understanding of the preferred embodiment of the present invention. It will be obvious to those skilled in the art that the present invention may be practiced without these specific details. Also, wellknown circuits have been shown in block diagram form, rather than in detail, in order to avoid unnecessarily obscuring the present invention.

OVERVIEW OF THE COMPUTER SYSTEM OF THE PRESENT INVENTION

Figure 2:
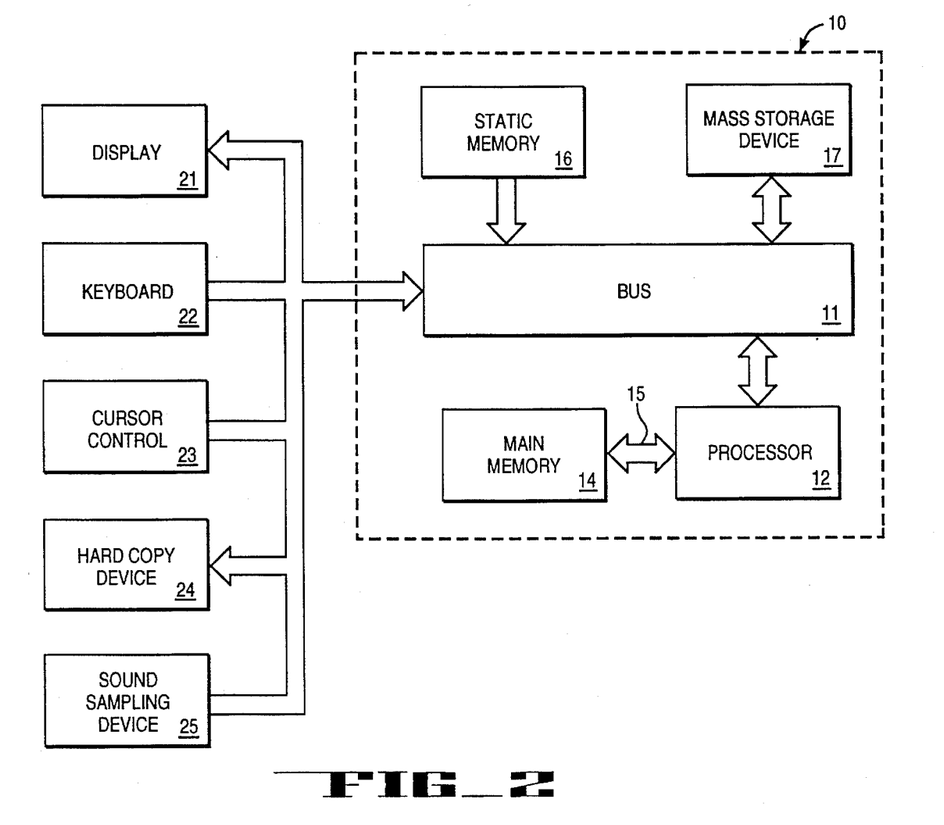
FIG. 2 is a block diagram of the computer system of the present invention.

Referring to FIG. 2, an overview of a computer system of the present invention is shown in block diagram form. It will be understood that while FIG. 2 is useful for providing an overall description of the computer system of the present invention, a number of details of the system are not shown. As necessary for disclosure of the present invention, further detail is set forth with reference to the other FIGURES provided with this specification. Further, the present invention is described with reference to its preferred embodiment; alternative embodiments which may be conceived by one of ordinary skill in the art are considered within the scope of the claims set forth below.

As illustrated in FIG. 2, a computer system, as may be utilized by the preferred embodiment of the present invention, generally comprises a bus or other communication means 11 for communicating information, a processing means 12 coupled with bus 11 for processing information, a Random Access Memory (RAM) or other dynamic storage device 14 (commonly referred to as a main memory) coupled with processing means 12 via bus 15, for storing information and instructions for processing means 12, a Read Only Memory (ROM) or other non-volatile storage device 16 coupled with bus 11 for storing non-volatile information and instructions for processing means 12, a data storage device 17, such as a magnetic disk and disk drive, coupled with bus 11 for storing information and instructions, a display device 21, such as a cathode ray tube, liquid crystal display, etc., coupled to bus 11 for displaying information to the computer user, an alpha-numeric input device 22 including alpha-numeric and other keys, etc., coupled to bus 11 for communicating information and command selections to processor 12 and a cursor control 23 for controlling cursor movement. The system also includes a hard copy device 24, such as a plotter or printer, for providing a visual representation of the computer images. Hard copy device 24 is coupled with processor 12, main memory 14, non-volatile memory 16 and mass storage device 17 through bus 11. Finally, the system includes a sound recording and playback device 25 for providing audio recording and playback.

Of course, certain implementations and uses of the present invention may not require nor include all of the above components. For example, in certain implementations a keyboard and cursor control device for inputting information to the system may not be required. In other implementations, it may not be required to provide a display device for displaying information.

OVERALL BLOCK DIAGRAM OF THE MICROPROCESSOR

Figure 3:
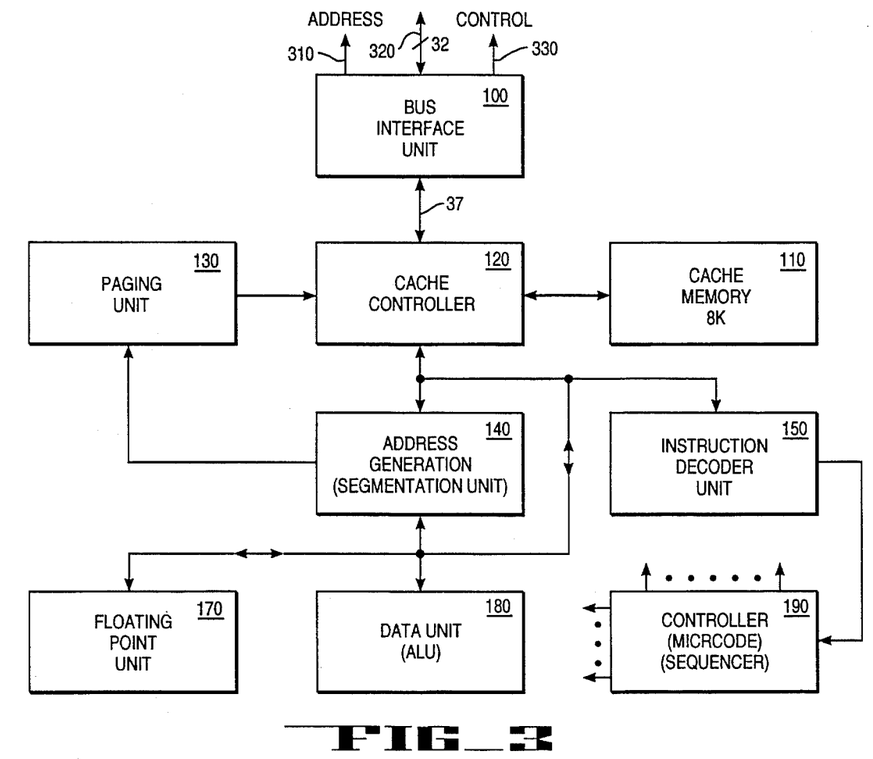
FIG. 3 is a block diagram of the microprocessor of the present invention.

Referring to FIG. 3, the microprocessor incorporating the bus transfer method of the present invention is shown in general block diagram form. The microprocessor includes a bus interface unit 100 which is coupled to a 32-bit external data bus 320, and additionally is coupled to an address bus 310 and several other control lines as will be described in conjunction with FIG. 3. (Note the term "data" is generally used to indicate information transferred over the data bus. This information may include instructions, constants, pointers, etc.) The interface unit 100 is coupled by address and data buses to a cache memory controller 120. Controller 120 controls the accessing of the cache memory 110. The controller 120 is coupled to the address generation unit 140; a paging unit 130 is also coupled between the address generation unit 140 and cache controller 120. For purposes of understanding the present invention, the address generation unit, segmentation and paging units may be assumed to be the same as that used in the commercially available the 80486 brand of microprocessor of Intel Corporation, assignee of the present invention.

For purposes of understanding the present invention, the specific configuration of a cache memory 110 and cache controller 120 are not important. Signal flow between the controller 120 and interface unit 100 insofar as needed to understand the present invention are described in conjunction with FIG. 3.

Within the microprocessor instructions are coupled to the instruction decoder unit 150. The decoder unit operates with a controller 190 in which microcode instructions are stored; the controller 190 provides sequences of control signals for the microprocessor. The instruction decoder unit 150 is shown coupled to controller 190; the outputs from the controller are coupled to all the other units of the microprocessor. The data unit 180 is an arithmetic logic unit (ALU) which performs ALU functions in a similar manner to those performed by the Intel 80486.

The microprocessor also includes a floating point unit 170 for performing floating point computations. The precise configuration of the unit 170 is not critical to the present invention although the block transfers required by the unit 170 and the cache memory 110 provided some of the impetus for the present invention.

The currently preferred embodiment of the microprocessor of FIG. 3 is realizable with known metal-oxide-semiconductor (MOS) technology and, in particular, with complementary MOS (CMOS) technology. The microprocessor is clocked by an external clock signal. On chip clock circuitry receives the external clock signal and provides the fundamental timing and the internal operating frequency for the microprocessor. In the currently preferred embodiment, all external timing parameters are specified with respect to the rising edge of the clock. Clock rates of 25 MHz or better are possible with current CMOS technology.

Figure 4:
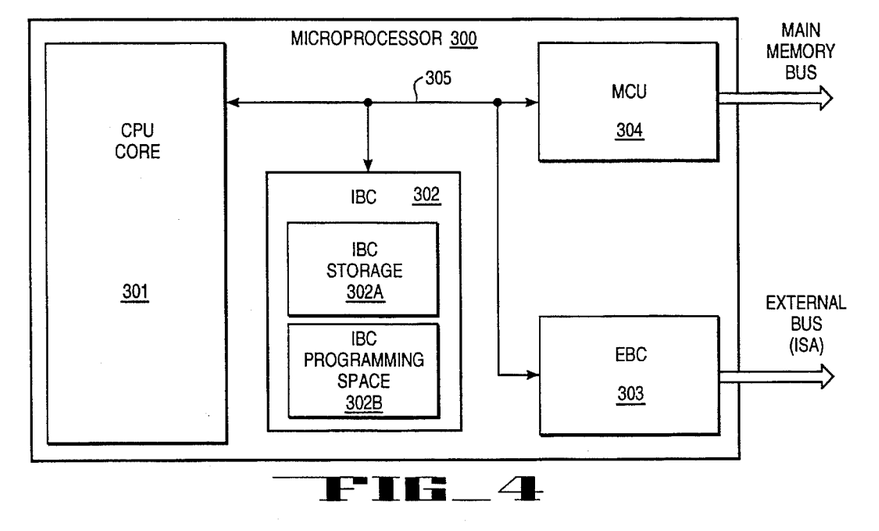
FIG. 4 is a simplified block diagram of the microprocessor of the present invention.

For purposes of explaining the present invention, a simplified view of the microprocessor of the present invention is shown in FIG. 4. Referring to FIG. 4, microprocessor 300 comprises internal bus 305 for communicating information in microprocessor 300, central processing unit (CPU) core 301 for processing instructions and data, internal bus controller (IBC) 302 for controlling communication over the internal bus 305, memory control unit (MCU) 304 for controlling accesses to main memory, and external bus or Industry Standard Architecture (ISA) controller (EBC) 303 for controlling communication between microprocessor 300 and the bus of the computer system. Each of the components is coupled to bus 305 which communicates information between them. In the currently preferred embodiment, MCU 304 coordinates data transfers between CPU core 301 and the main memory, including the generation of addresses for burst transfers. Also, EBC 303 coordinates data transfers between CPU core 301 and devices on the external ISA bus. In the currently preferred embodiment, CPU core 301 operates at twice the speed of the bus of the computer system.

The present invention supports different types of bus transfers. In the currently preferred embodiment, bus transfers can be single cycle or multiple cycle, burst or non-burst, cacheable or non-caoheable, and 8-, 16- or 32-bit transfers. The bus transfers in microprocessor 300 are coordinated by the memory control unit, the external bus controller and the internal bus controller.

Data transfers in microprocessor 300 are controlled by IBC 302. The signals generated by IBC 302 are sent to MCU 304 and EBC 303, which in turn provide access to the main memory bus and the external bus of the computer system, respectively. Thus, in this configuration, IBC 302, MCU 304 and EBC 303 are used to form the interface between microprocessor 300 and the remainder of the computer system.

In the currently preferred embodiment, MCU 304 runs DRAM cycles at relatively fast speeds (e.g., 25–33 MHz) while the EBC 303 runs all its cycles to the external or ISA bus at 8 MHz. By allowing the internal bus to run in pipelined mode, overall system performance is not impacted in spite of modules running at different speeds. Since both burst and non-burst address pipelining is supported, a further balance can be achieved in a system with both burst (MCU) and non-burst (EBC) modules present.

Figure 5:
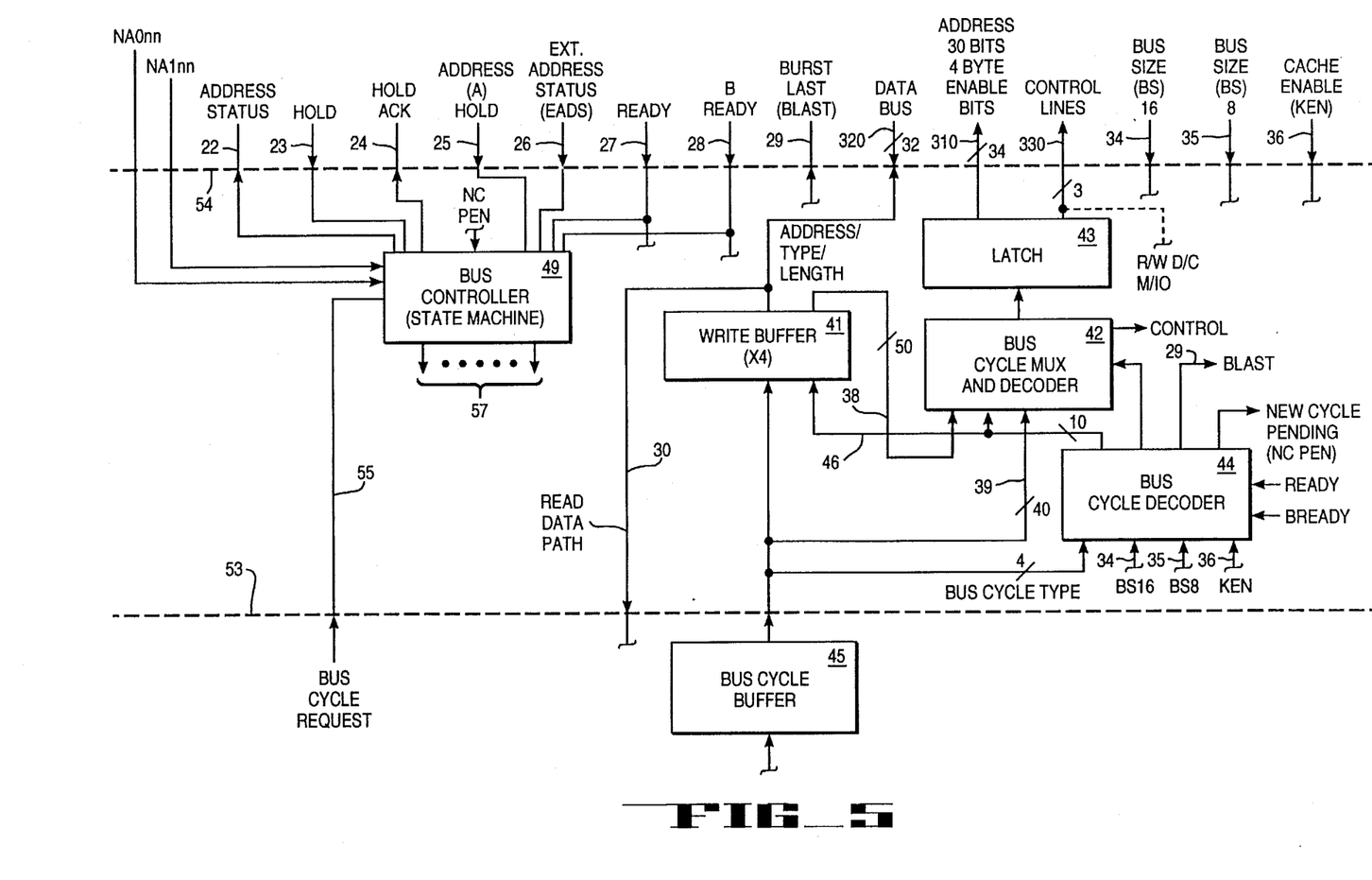
FIG. 5 is a block diagram of the bus interface unit of the microprocessor.

The major components of the interface are shown in FIG. 5 between the dotted lines 53 and 54. The cache controller 120 communicates with the interface unit 100 through the bus cycle buffer 45. All memory addresses, various control signals and all data to be entered into external memory are communicated to interface unit 100 through the buffer 45. Incoming data (read data path) is communicated directly to the cache controller 120 through the interface unit 100.

The output data of buffer 45 is coupled to the write buffer 41. This buffer is "4 deep", thus permitting data from buffer 45 for four CPU cycles to be temporarily stored in one of the four stages of the buffer 41. The output of the buffer 41 communicates directly with the data bus 300. Also stored in buffer 41 and associated with data stored in each of the four stages are signals representing the memory address, memory cycle type and length. The signals representing bus cycle type, etc., are coupled from the decoder 44 via lines 46 to the buffer 41 and to the bus cycle multiplexer and decoder 42.

The bus cycle multiplexer and decoder 42 selects either the address signals, bus type signals, etc., (i) from the buffer 41 (lines 38) or, (ii) directly from the buffer 45 (lines 39) and lines 46. The output of multiplexer and decoder 42 is coupled to the latch 43. The output of the latch provides the address signals (30 bits of address and 4 bits (byte enable signals)) on bus 310 and control lines for the memory on lines 330.

Four bits from the buffer 45 are coupled to the bus cycle decoder 44 to indicate the type of bus cycle. These bits indicate up to 16 different types of bus cycles, such as memory read, memory write, ! /0 read/write, prefetch, branch, locked read, locked write, write not finished, in-circuit emulator (read or write), and read and write to paging unit 130. The bus cycle type bits are decoded in decoder 44 and used to control, for example, the multiplexer 42, and to provide certain outputs such as the "blast" signal which shall be discussed.

The bus controller 49 receives a bus cycle request signal on line 55 in addition to several other inputs which shall be described. The bus controller provides control signals on lines 57 to the various circuits in the bus interface unit 10 including the bus cycle decoder 44, bus cycle multiplexer and decoder 42, latch 43 and buffer 41. The bus controller operates as an ordinary state machine.

The bus cycle decoder 44 provides the blast signal (burst last, sometimes referred to as the last signal). This signal (active low) indicates that a microprocessor data request (input or output) will be satisfied at the next ready signal on lines 27 or 28.

INPUTS TO AND OUTPUTS FROM THE BUS INTERFACE UNIT 100

The major external inputs to the bus interface unit and the major outputs (to external circuitry) from the unit 10 are shown in FIG. 5 along line 54. The data bus 320 is a 32-bit bidirectional bus. All 32 lines of this bus typically require a connection to external circuitry. The microprocessor provides a memory address on the address bus 310. This address consists of 30 bits of address signals and four byte enable bits. The three memory control lines 330 indicate read/write to memory, input/output and data vs. control (for example, prefetch from memory vs. data read). The address status (ADS) is an active low signal on line 22 indicating that the address on bus 310 is valid.

The memory cycle requests by the microprocessor generally require 32 bits of data read from memory or written to memory (larger transfers such as those associated with a cache memory are discussed later). In some cases, the memory may be limited to an 8-bit or 16-bit bus. If this is the case, the memory provides an appropriate signal on lines 34 or 35. The signal on line 35 (bus size 8) indicates that the transfer will be satisfied with eight bit transfers whereas the signal on line 34 (bus size 16) indicates that the request will be satisfied with 16 bit transfers. Lines 34 and 35 are coupled to the bus cycle decoder 44 and their use particularly for the generation of the blast signal on line 29 shall be discussed later in the application.

As mentioned, the microprocessor includes an on-chip cache memory. Certain data is designated for storage within the cache memory. External circuitry examines addresses from the microprocessor and determines if a particular address falls within address space designated for storage within the cache memory. This is generally done for instructions, constants, etc., and not done for data which is shared. If external circuitry determines that the data requested is "cacheable" that is, it should be stored in the cache memory, then the KEN signal is returned (active low) on line 36. This signal is coupled to the decoder 44 and is used in generating the blast signal.

The input on line 23 is an ordinary "hold" signal and the output on line 24 is a hold acknowledge. The input signal on line 25 (address hold) indicates that the external address bus is to be immediately floated. This is done to support cache invalidation. Line 26 provides an external address status. Lines 27 and 28 receive a ready signal and a "burst" ready signal, respectively. These signals are also coupled to the bus cycle decoder 44.

Bus controller 49 also receives two signals, NA0nn and NA1 nn from the internal bus controller 302. The NA0nn pin indicates to the bus interface unit whether the transfer is a burst transfer. The NA1nn signal indicates to the bus interface unit that the transfer is a non-burst transfer.

NON-BURST CYCLES

In the currently preferred embodiment, a bus cycle is at least two clocks long and begins with ADS# active in the first clock and RDY# active in the last clock. Data is transferred to and from the microprocessor during a data cycle. A bus cycle contains one or more data cycles.

In the currently preferred embodiment, a non-burst single bus cycle transfer is two clocks long. The transfer could be either a read or write. The microprocessor initiates a cycle by asserting the address status signal, ADS#, at the rising edge of the first clock. The ADS# signal output indicates that a valid bus cycle definition and address are available on the cycle definition lines and address bus. The non-burst ready input RDY# is returned by the external system in the second clock. The RDY# indicates that the external system has presented valid data on the data pins in response to a read or the external system has accepted data in response to a write. The microprocessor samples the RDY# signal at the end of the second clock. The cycle is complete if the RDY# signal is active (i.e., low) when sampled. Note that the RDY# signal is ignored at the end of the first clock of the bus cycle.

BURST CYCLES

To implement burst cycles, the burst ready (BRDY#) pin is used. (The # is used to indicate that the signal is active low). This pin indicates a burst ready to the invented microprocessor. For all cycles that cannot be bursted, e.g., interrupted acknowledge and halt, this pin has the same affect as the normal ready (RDY#) pin. When returned in response to a burstable cycle, the microprocessor expects that the external memory system is performing a burst transfer. If both the BRDY# and RDY# signals are returned in the same clock, the BRDY# signal is ignored.

The fastest burst cycle possible requires two clocks for the first data item to be returned to the processor with subsequent data items returned every clock. Burst cycles need not return data on every clock. The microprocessor will only strobe data into the chip when either RDY# or BRDY# are active. Thus, BRDY# need not be generated every clock for burst operations. During each part of the burst transfer, the BLAST# pin indicates whether the burst will end on the next ready. The microprocessor drives BLAST# inactive in the clock BRDY# is returned to indicate more data cycles are necessary to complete the burst. If BLAST# is driven active in the clock that BRDY# is returned, the burst transfer has completed, and the microprocessor will either drive out a new bus cycle, or the bus will go idle. Since the BLAST# output is a function of the cache enable (KEN#) pin and the bus sizing pins BS8# and BS16# inputs sampled in the previous clock, BLAST# is not valid in the first clock of a bus cycle, and is sampled only in the second and subsequent clocks when RDY# or BRDY# is returned.

When initiating any read, the invented microprocessor presents the address for the data requested. As described above, when the microprocessor converts a cycle into a cache fill, the first data item returned should correspond to the address sent out by the microprocessor with the exception that all byte enables should be taken as being active. This remains true whether the external system responds with the sequence of normal bus cycles or with a burst cycle. It should be noted that in the currently preferred embodiment, bursts can occur for prefetches regardless of the status of the cache enable KEN#.

FIG. 6 depicts the timing diagram of a typical burst cycle. Referring to FIG. 6, data from the initial address 104 is strobed into the microprocessor at time 82 when BRDY# is active low. The BRDY# pin indicates that the external system has presented valid data on the data pins in response to a read or that the external system has accepted the microprocessor data in response to a write request. The other data items used to fill the cache are transferred at times 83, 84, and 85 in response to address 100, 10C and 108.

Burst cycles can also be returned as 8 or 16-bit cycles if BS8# or BS16# are active. In this case, the burst cycle would stretch to 16 data cycles long. The sequencing of addresses is the same as if burst cycles are not returned and the data is expected by the microprocessor on the same data lines as if the data were not being returned in a burst cycle. Also, note that a single 32-bit noncacheable microprocessor read could be read into the microprocessor as four 8-bit burst data cycles. Similarly, a single 32-bit 486 write could be written as four 8-bit burst data cycles. In the currently preferred embodiment, burst writes can only occur if BS8# or BS16# is asserted. Furthermore, if BS8#/BS16# is returned, the microprocessor first completes the transfer of the current word before progressing to the next word.

ADDRESS PIPELINING

The microprocessor of the present invention supports address pipelining during data transfers. Address pipelining allows the bus cycles to be overlapped, increasing the amount of time available for the memory or input/output (I/O) devices to respond. The present invention directly benefits peripheral modules by removing idle cycles between back-to-back cycles when they are running at a different bus frequency. The effective number of CPU wait states is reduced. Also the present invention allows peripheral modules to run in parallel because the next bus cycle is allowed to begin before the current bus cycle is complete.

In the currently preferred embodiment, address pipelining is facilitated using two pins, NA0nn and NA1 nn (NA representing the next address). The NA0nn and NA1 nn pins are used to request the next non-burst and burst address respectively. The IBC 302 decides which of the two inputs to assert on a cycle-by-cycle basis. When an address is asserted on the internal address bus of the microprocessor, IBC 302 maps the address into a storage space, such as IBC storage space 302A, to determine whether the address is for main memory or whether the address is for a device coupled to the external (ISA) bus of the computer system. If the address is to main memory, to and from which burst data transfers are run, then IBC 302 activates the NA1 nn pin. In the currently preferred embodiment, activation of the NA1 nn pin comprises pulling the pin low (i.e., pulling the pin to ground). The activating of the NA1 nn pin causes a burst data transfer to occur and any if another burst data transfer request occurs during the current burst data transfer, then the address can be driven onto the address bus while the data is being transferred on the data bus during the previous burst data transfer. If the address is to a device, to and from which non-burst data transfers are run, then IBC 302 activates the NA0nn pin. In the currently preferred embodiment, activation of the NA0nn pin comprises pulling the pin low (i.e., pulling the pin to ground). The activating of the NA0nn pin causes a non-burst data transfer to occur. If another non-burst data transfer request occurs during the current non-burst data transfer, then the address can be driven onto the internal address bus of the processor while the data is being transferred on the data bus during the previous non-burst data transfer.

Figure 7:
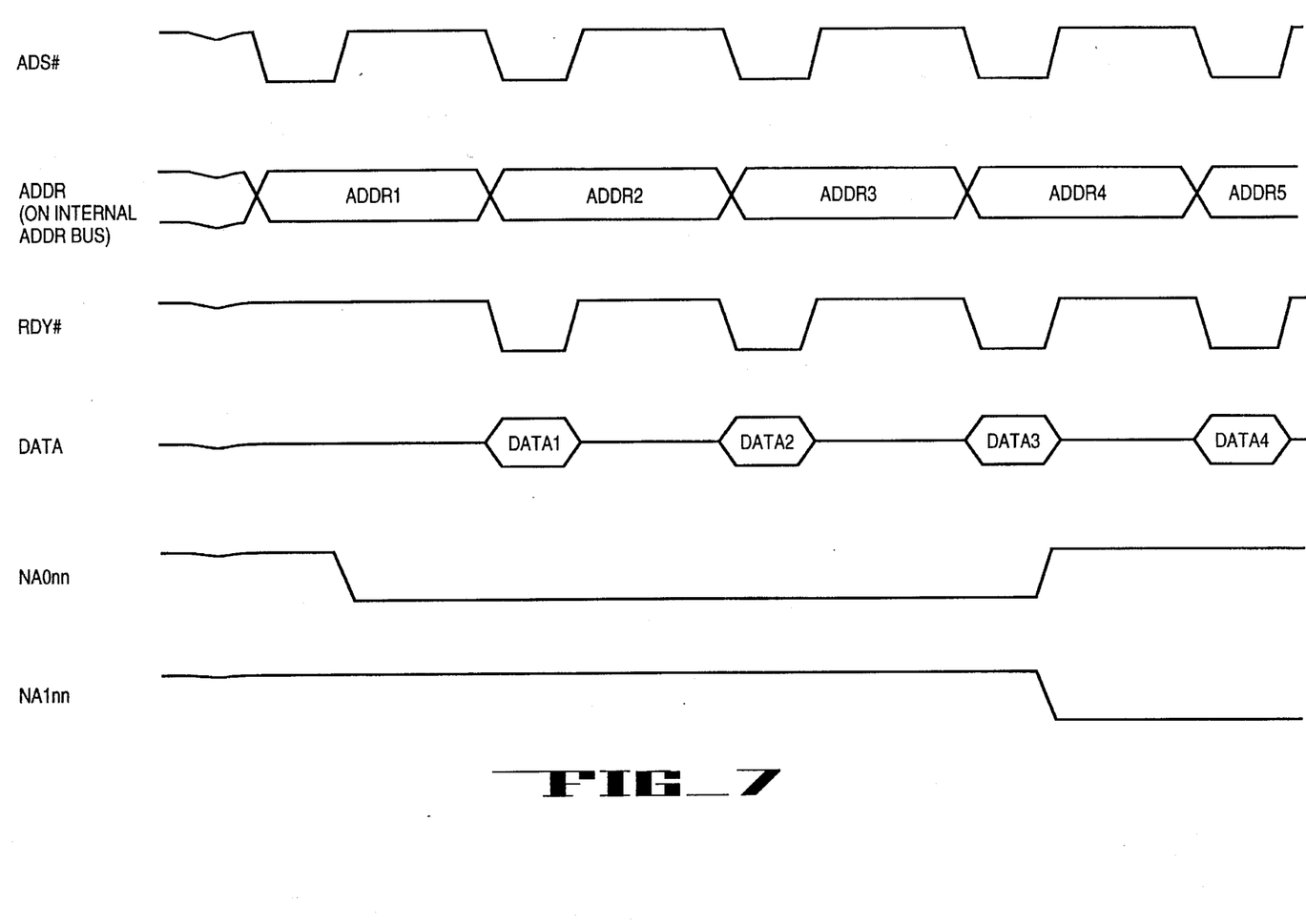
FIG. 7 is a timing diagram illustrating an example of address pipelining of non-burst data transfers.

FIG. 7 illustrates an example of the pipelining of the addresses during a non-burst transfer of data in the computer system. The transfer could be either a read or write. The microprocessor initially drives the address onto the internal address bus of the microprocessor. The IBC 302 maps the address into its internal address space and determines whether the address corresponds to a device on the external (ISA) bus. If it does, IBC 302 activates address pipelining by pulling the NA0nn pin low. This indicates to the CPU core that the address corresponds to a device on the external bus and that device can only accommodate non-burst transfers. Then the microprocessor initiates a cycle by asserting the address status signal, ADS#, at the rising edge of the first clock. As stated above, the ADS# signal output indicates that a valid bus cycle definition and address are available on the cycle definition lines and address bus. Note that in the currently preferred embodiment, the NA0nn pin is ignored at the end of the first clock of the bus cycle. The non-burst ready input RDY# is returned by the external system in the second clock. To reiterate, the RDY# indicates that the external system has presented valid data on the data pins in response to a read or the external system has accepted data in response to a write. The CPU core 301, via IBC 302, samples the RDY# signal at the end of the second clock. The cycle is complete if the RDY# signal is active (i.e., low) when sampled.

When the RDY# signal is sampled, if a request for another non-burst data transfer has occurred, then the address is driven onto the internal address lines of the microprocessor simultaneously to the transferring of the data from the previous address. In this manner, the address can be pipelined, such that the RDY# signal can be asserted and data for the next transfer can be ready at the next clock, such that the latency problem described previously is eliminated.

Referring specifically to FIG. 7, if CPU core 301 attempts a burstable transfer to a device which can only accommodate non-burst transfers, CPU core 301 must provide all of the addresses to complete the burst transfer. For example, the CPU core 301 drives address ADDR1 onto the internal address bus of microprocessor 300 and strobes the ABS# signal. If IBC 302 determines that the address corresponds to a device on the external (ISA) bus, then IBC 302 activates the NA0nn pin (i.e., pulls it low) indicating to the CPU core 301 that the device corresponding to the address cannot accept burst transfers. Thus, because EBC 303 does not generate the remaining address for the burst transfer (i.e., ADDR2, ADDR3 and ADDR4), CPU core 301 must generate the addresses for EBC 303. CPU core 301 provides the addresses with the strobing of the ADS# signal to EBC 303. Note that each of the addresses ADDR2, ADDR3 and ADDR4, are driven onto the bus while the data corresponding to the previous address is being transferred, i.e. DATA1, DATA2 and DATA3 respectively. In this manner, the present invention makes transfers to the external (ISA) bus look like a burst transfer.

Note that when driving the last transfer of data, DATA4, corresponding to the burst, the address of the next bus cycle ADDR5 is driven onto the address bus and strobed by ADS#. If IBC 302 decodes the address ADDR5 and determines that ADDR5 is for MCU 304, IBC 302 drives NA0nn inactive and NA1nn active. When CPU core 301 strobes the address ADDR5, MCU 304 is able to begin the bus cycle while EBC 303 is completing the bus cycle corresponding to address ADDR1-ADDR4, thereby allowing both modules to operate in parallel. Note that because CPU Core 301 operates in a pipelined manner itself, the address ADDR5 was probably ready before its actual assertion onto the internal address bus.

FIG. 8 illustrates an example of the pipelining of the addresses during a burst transfer of data in the computer system. The transfer could be either a read or write. The microprocessor initially drives the address ADDR1 onto the internal address bus of the microprocessor. The IBC 302 maps the address into its internal address space and determines that the address corresponds to the main memory. In response, IBC 302 pulls the NA 1 nn pin low to indicate to CPU core 301 that the burst cycle is being undertaken by MCU 304. Then the microprocessor initiates a cycle by asserting the address status signal, ADS#, at the rising edge of the first clock. In response, MCU 304 generates the addresses for the bytes to be transferred in the burst cycle. Note that the NA1nn pin is ignored at the end of the first clock of the bus cycle. The burst ready input BRDY# is returned by the external system in the second clock. The microprocessor samples the BRDY# signal at the end of the second clock. Data DATA1 corresponding to the initial address, ADDR1, is strobed into the microprocessor when BRDY#is active low. The other data items, DATA2–DATA4, are then strobed as the series of burst addresses is asserted by MCU 304 onto the address bus of the computer system. Note that the NA1nn pin is ignored until the end of the first clock of the last burst bus cycle for the current address. The cycle is complete if the BRDY# signal is active (i.e., low) when sampled. When the BRDY# signal is sampled for the last 4 bytes of data, if a request for another burst data transfer has occurred, then the address is driven onto the address lines simultaneously to the transferring of the data from the previous address. In this manner, the address can be pipelined, such that the BRDY# signal can be asserted and data for the next transfer can be ready at the next clock, such that the latency is eliminated.

Note that while the burst transfer is occurring, CPU core 301 may be ready to assert the address of the next bus cycle. In fact, if either the NA0nn or NA1nn pins are active (i.e., pulled low), then CPU core 301 may assert the address for the next bus cycle onto the internal address bus prior to the conclusion of the previous bus cycle.

When a burst transfer is occurring, CPU core 301 can assert the address for the next bus cycle, ADDR2, when the address is ready. CPU core 301 strobes the ADS# signal until the current bus cycle is completed (e.g., the burst transfer is completed). IBC 302 decodes the address and determines whether it is in the address space of the main memory or is in the address space of devices on the external (ISA) bus. By allowing ADDR2 to be asserted before the completion of the burst transfer, the addresses on the internal bus can be pipelined, thereby making data transfer more efficient. Once the burst data transfer corresponding to ADDR1 is completed, the transfer of data corresponding to ADDR2 can begin. As shown in FIG. 8, if the address is in the address space of the external (ISA) bus, then IBC 302 will drive NA 1 nn inactive and NA0nn active, and the data transfer corresponding to ADDR2 will be completed as any other transfer involving devices on the external (ISA) bus.

In the currently preferred embodiment, the IBC has a programming space 302B which contains bits to enable and disable either or both the burst address pipelining and the non-burst address pipelining. In this manner, the address pipelining of the present invention can be achieved through software control. In the currently preferred embodiment, this control would be from the basic input/output system (BIOS) that would set the bits depending on whether the modules in the microprocessor could support the pipelining.

Whereas many alterations upon applications of the present invention will no doubt become apparent to a person of ordinary skill in the art after having read the foregoing description, it is understood that the particular embodiment shown and described by illustration is in no way intended to be limiting. Therefore, reference to details of the preferred embodiments are not intended to limit the scope of the claims which themselves recite only those features regarded as essential to the invention.

Thus, a method and apparatus for pipelining address has been described.

We claim:

1. A computer system comprising:

a memory;

an external bus device; and a microprocessor having an internal bus, a central processing unit (CPU) core, coupled to said internal bus, operable to transfer data to and from said internal bus, a memory controller, coupled to said internal bus and said memory, to coordinate data transfers via said internal bus between said CPU core and said memory at a first frequency, and an external bus controller, coupled to said internal bus and said external bus device, to coordinate data transfers via said internal bus between said CPU core and said external bus device at a second frequency different than said first frequency, wherein said microprocessor generates addresses for burst and non-burst transferring and also generates a first address and a second address and said microprocessor further determines if a transfer is burst or non-burst transfer and wherein, during separate transfers, the microprocessor pipelines addresses on the internal bus, such that said first address corresponding to said external bus device is driven on said internal bus while a data transfer occurs between said microprocessor and said memory and said second address corresponding to said memory is driven on said internal bus while a data transfer occurs between said microprocessor and said external bus device.

2. The computer system defined in claim 1 wherein said data transfers between said microprocessor and said memory are burst transfers.

3. The computer system defined in claim 2 wherein said data transfers between said microprocessor and said external bus device are non-burst transfers.

4. The computer system defined in claim 1 wherein data transfers between said microprocessor and said external bus device and said memory occur, such that idle cycles between back-to-back data transfer cycles are removed.

5. The computer system of claim 1 wherein the microprocessor further comprises an internal bus controller, coupled to said internal bus, said memory controller and said external bus controller, operable to decide, based on an address provided by said CPU core, whether said address is to said memory or to said external bus device and to signal to said memory controller and to said external bus controller.

6. The computer system of claim 5 wherein said internal bus controller further comprises a storage space and decides whether said address is to said memory or to said external bus device based on mapping said address into said storage space.

7. The computer system of claim 1 wherein said data transfers between said external bus controller and said external bus device are operable in a pipelined manner.

8. The computer system of claim 1 wherein said data transfers between said memory and said memory controller are operable in a pipelined manner.

9. The computer system of claim 5 wherein said internal bus controller further comprises a programming space comprising bits to enable and disable pipelining, and data transfers between said external bus controller and said external bus device and between said memory and said memory controller are each operable in a pipelined manner or in a nonpipelined manner depending on said enable and disable bits.

10. The computer system of claim 1 wherein said CPU core is operable to provide a sequence of data addresses required for burst transfers between said CPU core and said external bus device.

11. The computer system of claim 1 wherein the memory controller generates addresses for burst transfers.

12. A microprocessor operable in conjunction with a main memory and an external bus device, comprising:

(a) an internal bus;

(b) a central processing unit (CPU) core, coupled to said internal bus, operable to transfer data to and from said internal bus;

(c) a memory controller, coupled to said internal bus, to coordinate data transfers via said internal bus between said CPU core and said main memory; and (d) an external bus controller, coupled to said internal bus, to coordinate data transfers via said internal bus between said CPU core and said external bus device;

wherein said microprocesor generates addresses for burst and non-burst transferring and also generates a first address and a second address and said microprocessor further determines if a transfer is burst or non-burst transfer.

said memory controller and said external bus controller being operable such that data transfers between said external bus device and said external bus controller occur concurrently with data transfers between said main memory and said memory controller, wherein, during separate transfers, the microprocessor pipelines addresses on the internal bus, such that said first address corresponding to said external bus device is driven on said internal bus while a data transfer occurs between said microprocessor and said memory and said second address corresponding to said memory is driven on said internal bus while a data transfer occurs between said microprocessor and said external bus device.

13. The microprocessor of claim 12, further comprising (e) an internal bus controller, coupled to said internal bus, said memory controller and said external bus controller, operable to decide, based on an address provided by said CPU core, whether said address is to said main memory or to said external bus device and to signal to said memory controller and to said external bus controller.

14. The microprocessor of claim 13, wherein said internal bus controller further comprises a storage space and decides whether said address is to said main memory or to said external bus device based on mapping said address into said storage space.

15. The microprocessor of claim 12, wherein said data transfers between said external bus controller and said external bus device are operable in a pipelined manner.

16. The microprocessor of claim 12, wherein said data transfers between said main memory and said memory controller are operable in a pipelined manner.

17. The microprocessor of claim 13, wherein said internal bus controller further comprises a programming space comprising bits to enable and disable pipelining, and data transfers between said external bus controller and said external bus device and between said main memory and said memory controller are each operable in a pipelined manner or in a non-pipelined manner depending on said enable and disable bits.

18. The microprocessor of claim 12, wherein said CPU core is operable to provide a sequence of data addresses required for burst transfers between said CPU core and said external bus device.

19. The microprocessor of claim 12, wherein the memory controller generates addresses for burst transfers.

20. The microprocessor of claim 12 wherein data transfers between said external bus device and said microprocessor and between said main memory and said microprocessor are at different speeds.

* * * * *

UNITED STATES PATENT AND TRADEMARK OFFICE
CERTIFICATE OF CORRECTION

PATENT NO. : 5,469,544
DATED : November 21, 1995
INVENTOR(S) : Aatresh et al.

It is certified that error appears in the above-indentified patent and that said Letters Patent is hereby corrected as shown below:

In column 3 at line 36 delete "FIGURES" and insert --figures--

In column 5 at line 23 delete "non-caoheable" and insert --non-cacheable--

In column 6 at line 7 delete "! /0" and insert --I/O--

In column 8 at line 23 delete "BSB#" and insert --BS8#--

Signed and Sealed this

Twenty-fourth Day of December, 1996

Attest:

BRUCE LEHMAN

*Attesting Officer*     *Commissioner of Patents and Trademarks*